(12) United States Patent
Egawa et al.

(10) Patent No.: US 6,297,930 B1
(45) Date of Patent: Oct. 2, 2001

(54) MAGNETIC HEAD

(75) Inventors: Motoji Egawa; Satoshi Kawashima, both of Asaba-cho (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/323,985

(22) Filed: Jun. 2, 1999

(30) Foreign Application Priority Data

Jun. 30, 1998 (JP) .................................................. 10-183582

(51) Int. Cl.$^7$ ...................................................... G11B 5/10
(52) U.S. Cl. .............................................................. 360/125
(58) Field of Search .................................... 360/128, 121, 360/122, 123, 124, 125, 129, 319; 29/603.04, 603.07

(56) References Cited

U.S. PATENT DOCUMENTS

| | | | | |
|---|---|---|---|---|
| 5,148,342 | * | 9/1992 | Kato ...................................... | 360/121 |
| 5,402,397 | * | 3/1995 | Ohmori et al. ......................... | 369/13 |
| 5,459,629 | * | 10/1995 | Wakasugi ............................ | 360/246.2 |
| 5,497,283 | * | 3/1996 | Kato ...................................... | 360/123 |
| 5,629,821 | * | 5/1997 | Wakasugi et al. .................... | 360/125 |
| 5,889,642 | * | 3/1999 | Egawa et al. ......................... | 360/125 |
| 5,963,402 | * | 10/1999 | Egawa et al. ......................... | 360/125 |
| 6,075,681 | * | 6/2000 | Egawa et al. ......................... | 360/128 |

FOREIGN PATENT DOCUMENTS 7-235013    9/1995    (JP) .
10-40525    2/1998    (JP) .

* cited by examiner

Primary Examiner—William Klimowicz
Assistant Examiner—Chen Tianjie
(74) Attorney, Agent, or Firm—Oliff & Berridge, PLC

(57) ABSTRACT

A cut out 23 is formed at the corner portion 22 which is formed between the second long side $8_{22}$ and each of the first and second short sides $8_{11}$ and $8_{12}$ of the back yoke 5, in which the terminal stands 20d of the bobbins 20 of the read/write coil 6 and the erasing coil 7 are disposed respectively, a shield cover 32 is provided in such a manner as it is coupled with the first, second and third leg portions 10a, 10b and 10c including the wiring 6A of the read/write coil 6 and the wiring 7A of the erasing coil 7 and the front core 3 is bonded to the outer body 8 and the shield cover 32. Thereby, the bridging portion which has been necessary in the conventional example is almost eliminated, as a result, the strength of the front core 3 is increased to prevent it from being broken due to any shocking force. Since the terminal stands 20d of the read/write coil 6 and the erasing coil 7 are accommodated in the cut out 23 and not positioned outside the back yoke 5, to that extent, the apparatus is planned to be miniaturized.

14 Claims, 11 Drawing Sheets

MAGNETIC HEAD

BACKGROUND OF THE INVENTION

1. Field of Invention

The present invention relates to a magnetic head for floppy disc drive.

2. Background of Related Art

In general, since a FDD (floppy disc drive) is installed within a personal computer, the magnetic head of the FDD is likely to generate a reading error due to an electromagnetic noise from a CTR, a switching source and such. Then, in order to avoid such a reading error, it is a general countermeasure to shield the magnetic head with a magnetic material having a high permeability such as permalloy or ferrite (hereinafter referred this general magnetic head to as "conventional example 1").

Now, recently in a note-type of personal computer (note personal computer) and such low-profile FDD having half-inch thickness is used. In this type, it has been difficult to shield the magnetic head with the material having a high permeability such as permalloy or ferrite. As a countermeasure to that, there is what is disclosed in the patent laid-open No. Hei 7-235013 (hereinafter referred to as "conventional example 2").

The magnetic head 1 of the conventional example 2 comprises roughly, as shown in FIG. 5, a front chip core 2 having a read/write gap $G_1$ and an erasing gap $G_2$, a first slider 4a and a second slider 4b which are made of a non-magnetic material (not shown) and form the front core 3 while being formed in unit with the front chip core 2 across the front chip core 2, each side of which slides (upper in FIG. 5) on a magnet recording medium (not shown), a back yoke 5 which is made of a magnetic material having a high permeability such as permalloy or ferrite and contacts to the other side of the front core 3 and a read/write core 6 and an erasing coil 7 later mentioned respectively.

The back yoke 5 comprises a hollow square pillar-like outer body 8 whose tip end contacts to the afore-mentioned front core 3, a block body 40 comprising a bottom portion 9 formed at the proximal side of the outer body 8 and similarly shaped three leg portions 10a, 10b and 10c (hereinafter referred to as "the first, second and third leg portion" viewing from right to left direction in FIG. 5) which stand upright on the bottom portion 9 in juxtaposing manner, each tip ends of which contacts to the afore-mentioned front chip core 2 to form a closed magnetic circuit (not shown) together with the front chip core 2 and afore-mentioned bottom portion 9.

The outer body 8 is of approximately a hollow square pillar shape formed by connecting two opposing short side portions (hereinafter referred to as "first short side portion $8_{11}$" positioned right below in FIG. 5 and "second short side portion $8_{12}$" positioned left upper in FIG. 5) and two opposing long side portions (hereinafter referred to as "first long side portion $8_{21}$" right upper in FIG. 5 and "second long side portion $8_{22}$" left below in FIG. 5), and between the first short side portion $8_{11}$ and the first leg portion 10a and between the second short side portion $8_{12}$ and the third leg portion 10c, a window 11 for a lead wire is formed. From the window 11 for lead wire, a lead 6a of the read/write coil 6 and a lead 7a of the erasing coil 7 are drawn out and connected to outer connecting terminals of a not shown FPC (flexible printed circuit board) etc.

The first and third leg portions 10a and 10c are inserted in the afore-mentioned read/write coil 6 and the erasing coil 7.

In the magnetic head 1 of this conventional example 2, the back yoke 5 is made of magnetic material having a high permeability such as Mn—Zn ferrite, the outer body 8 and the bottom portion 9 function as a magnetic shield. And, in this case, since the back yoke 5 provided on the magnetic head 1 functions as a magnetic shield, a problem of the difficulty of the magnetic shielding generated in the case where the magnetic shield is carried out in a low profile FDD in the conventional example 1 is planned to be improved.

Now, in the conventional example 2, although that is the type in which the coils are of lead wire, it is thinkable, in place of the coil to be used in the conventional example 2, to use a bobbin type of coil with terminals (hereinafter referred to as "bobbin coil with terminals") which is formed in such a manner as, as a coil, a bobbin made of a high heat resistance resin such as LPC and metal terminals are molded in a unit and with such bobbin wirings are coupled. In this case, in order to accommodate a terminal stand for the bobbin coil with terminals, the outer body is necessary to make large, for that reason, it has been difficult to miniaturize the magnetic head.

Further, in the back yoke 5 of the conventional example 2, as well as in manufacturing a ceramic, it is formed by molding a powder of Mn—Zn ferrite and such and a binder to a given shape with a mold, then is adapted to be sintered at a high temperature while burning out the binder and solidifying the powder simultaneously. Accordingly, if the leg portions (10a, 10b and 10c) are made slimmer, there is anxiety that the leg portions are suffered from being bent or generating any crack. For that reason, in the conventional example 2, it has been difficult to make the leg portions slimmer which is led to miniaturize the apparatus as a whole.

Against such problem as bending or generating of crack on the leg portions is generated after sintering, there is one magnetic head in which the leg portions are made slimmer by a post-machining after sintering. Such an example is illustrated in Japanese patent laid-open publication No. Hei 10-40525 (hereinafter referred to as "conventional example 3).

The magnetic head 1 of the conventional example 3 comprises, as shown in FIGS. 6 and 7, a front core 3 which consists of a slider 4 and a front chip core 2 to be inserted in a hole 12 formed in the slider 4 and a back yoke 5 made of magnetic material having high permeability which is manufactured showing as follows.

The back yoke 5 is different, compared with the one of the conventional example 2, in that it has no window 11 for the lead on the bottom portion 9, that on the second long side portion $8_{22}$ the first, second and third projections 13a, 13b and 13c which extend to the first, second and third leg portions 10a, 10b and 10c respectively are formed and that the first and second short side portions $8_{11}$ and $8_{12}$ are provided with cut outs 14 respectively.

And, in this back yoke 5 is, at the time of being powder-molding and sintered, as shown in a dotted line 15 in FIG. 6, the first, second and third leg portions 10a, 10b and 10c are connected to the outer body 8 (the first, second and third projections 13a, 13b and 13c), and by a post-machining such as cutting for grooving, the portions circled with the dotted line 15 in FIG. 6 are removed to separate the first, second and third leg portions 10a, 10b and 10c into a given width (thickness). Due to this cutting for grooving, the cut out 14 is formed on the first and second short side portions $8_{11}$ and $8_{12}$. Through the cut out 14, the lead 6a of the read/write coil 6 and the lead 7a of the erasing coil 7 are drawn out.

In the magnetic head 1 of the conventional example 3, the first, second and third leg portions 10a, 10b and 10c are, at the time of molding and sintering, connected to the outer body 8 and which prevent the leg portions 10a, 10b and 10c from being bent and being suffered from generating cracks.

However, in the above mentioned magnetic head 1 of the conventional example 3, when machining the first, second and third leg portions 10a, 10b and 10c into the given thickness, simultaneously on the outer body 8 the cut out 14 is formed, which happens to cause to bring about easily entering of outer noises through this cut out 14.

Further, since the magnetic head 1 of the conventional example 3 is not provided with the bobbin coil with terminal stand, when connecting terminal of coil to the external connecting terminal such as FPC (flexible printed circuit board), it is necessary to such work having the lead of coil in hand with tweezers. Therefore, much steps for such work are necessary and there has been a case where lead of coil and external connecting terminal are damaged with tweezers to break them.

Now, as an example of the magnetic head which uses the afore-mentioned bobbin coil with terminals, there is what is shown in FIG. 8 (hereinafter referred to as "conventional example 4").

This magnetic head 1 comprises, in general, as shown in FIG. 8, a front chip core 2 having a read/write gap $G_1$ (operation gap) and an erasing gap $G_2$ (operation gap), a non-magnetic material made slider 4 forming the front core 3 formed with a sliding surface S on one side thereof due to the front chip core 2 inserted in, a back yoke 5 made of a magnetic material having a high permeability such as Mn—Zn ferrite to be connected to the other side of the front core 3, a read/write coil 6 and an erasing coil 7.

The back yoke 5 comprises a block body 40 which is formed in the shape of approximately a hollow square pillar-like outer body 8 and the bottom portion 9 formed on the proximal side of the outer body 8 and the first, second and third leg portions 10a, 10b and 10c which stand upright on the second long side portion $8_{22}$ in the bottom portion 9 in juxtaposing manner. The portions of the first and second short side portions $8_{11}$ and $8_{12}$ which are located near the second long side portion $8_{22}$ are formed with the cut outs The read/write coil 6 and the erasing coil 7 are of the type which is the bobbin with the terminals obtained by being molded in a unit, in which a bobbin 20 made of a high temperature resistance resin such as LCP holds the wirings of the read/write coil 6 and the erasing coil 7.

The bobbin 20 is constituted, in general, from an approximately cylindrical bobbin body 20a with which a wiring 6A of the read/write coil 6 and a wiring 7A of the erasing coil 7, a plate-like extended portion 20c connected to a flange portion 20b of the bobbin body 20a and having the width a little smaller than the width of the cut out 14, an approximately square pillar-like terminal stand 20d connected to the tip end of the extended portion 20c perpendicularly to the extended portion 20c and a plurality of metal made terminal pins 20e molded in a unit with the lower side of the terminal stand 20d and to be connected to not shown some outer terminals such as FPC. The lead 6a of the read/write coil 6 and the lead 7a of the erasing coil 7 are connected to the terminal pins 20e of the terminal stand 20d.

In the read/write coil 6, the extended portion 20c is adapted to be accommodated in the cut out 14 in the state where the approximately cylindrical bobbin body 20a is inserted in the first leg portion 10a. And, in that state the read/write coil 6 (bobbin 20) and the first leg portion 10a are bonded in a unit with the adhesive such as epoxy adhesive.

In the erasing coil 7, the extended portion 20c is adapted to be accommodated in the cut out 14 in the state where the approximately cylindrical bobbin body 20a is inserted in the third leg portion 10c. And, in that state the erasing coil 7 (bobbin 20) and the third leg portion 10c are bonded in a unit with the adhesive such as epoxy adhesive.

Further, as a similar type of magnetic head there is what is shown in FIG. 9 (hereinafter referred to as –conventional example 5"). The magnetic head 1 of the conventional example 5 comprises, as shown in FIG. 9, a first and second slider 4a and 4b which are made of non-magnetic material and form the front core 3 on one side of which a sliding surface S is formed while being formed in a unit with the front chip core 2 across the front chip core 2, the back yoke 5 to be connected to the other side of the front core 3 and the coil of the bobbin type with the terminals (the read/write coil 6 and the erasing coil 7) which is approximately the same structure as that of the conventional example 4. For reference, in FIG. 9, sign 21 is a FPC to a specific part thereof the terminal pins 20e are connected.

However, since, in the magnetic heads 1 of the conventional examples 4 and 5, the terminal stand 20d is disposed outside the back yoke 5 (outer body 8), to that extent, it is difficult to miniaturize the apparatus, and that, the leads (lead 6a, 7a) of the terminal stand 20d are easily likely to be broken during assembling or using by touching to the shutter of the disc.

In order to improve the above problems of the conventional examples 4 and 5, there are the magnetic head as shown in FIGS. 10 and 11 (hereinafter referred to as "conventional example 6").

The magnetic head 1 of this example 6 is, as shown in FIGS. 10 and 11, comparing to the conventional example 4 in FIG. 8, different mainly in that a cut outs 23 are formed at the corner portions 22 which are formed at the place where the first and second short side portions $8_{11}$ and $8_{12}$ of the back yoke 5 and the second long side portion $8_{22}$ of the back yoke 5 are joined, and that in place of the read/write coil 6 and the erasing coil 7 the structure other than the one of the type shown in FIG. 8 (the terminal stand 20d and the bobbin body 20a are separated), in which the bobbin 20 is molded in a unit, is employed.

The cut out 23 is adapted to include the neighboring portions of the corner portion 22 consisting of the bottom portion 9, of the short side portions $8_{11}$ and $8_{12}$ and the long side portion $8_{22}$.

Each bobbin 20 of the read/write coil 6 and the erasing coil 7 comprises, in general, the approximately cylindrical bobbin body 20a with which the wiring of the read/write coil 6 or the erasing coil 7 is coupled, the approximately square pillar-like terminal stand 20d held by the flange portion 20b of the bobbin body 20a, and a plurality of metal made terminal pins 20e to be connected to the outer terminals such as FPC (not shown) which are molded in a unit with the terminal stand 20d at the below side thereof. The lead 6a of the read/write coil 6 and the lead 7a of the erasing coil 7 are connected to the terminal pins 20e.

In the read/write coil 6, the terminal stand 20d is adapted to be accommodated in the cut out 23 in the state where the approximately cylindrical bobbin body 20a is inserted in the first leg portion 10a. Further, in the erasing coil 7, the terminal stand 20d is adapted to be accommodated in the cut out 23 in the state where the approximately cylindrical bobbin body 20a is inserted in the third leg portion 10c, so that the miniaturization of the magnetic head can be carried out because the terminal stand 20d is approximately accommodated in the cut out 23 or the back yoke 5.

However, in the magnetic head 1 of the conventional example 6, since the terminal stand 20d is accommodated in the back yoke, the cut out 23 of the back yoke 5 has to make large accordingly. For that reason, the shield effect becomes worse to take easily the influence of some outer noises.

Further, due to the provision of the cut out 23, the contacting area of the back yoke 5 with the front core 3 becomes small, so that, since the bonding force becomes weak, the front core 3 and the back yoke 5 are apt to peel off easily.

Further, since the front core 3 is constructed in such a manner as it bridges the cut out 23, a shock from out side to the magnetic head 1 may be damaged in the bridging portion of the front core 3 by being bent for instance.

And, since a portable note book PC (personal computer) happens to be dropped often, as to the magnetic head to be used in a thinner type of FDD for use of PC, in particular, one which has a strength against a shock is desired to be made.

The present invention has been made in the above circumstance and is to provide a magnetic head miniaturized and strong against a shock.

SUMMARY OF THE INVENTION

The first feature of the present invention resides in a magnetic head which comprises a core front body having operation gaps, a non-magnetic material made slider forming a front core to be molded in a unit with the front chip core and slid on a magnetic recording medium with one side thereof, a magnetic material made back yoke to be connected to the other side of the front core, wherein the back yoke comprises a closed member consisting of a hollow square pillar-like outer body, the tip end of which is connected to the front core and a bottom portion formed at the proximal side of the outer body, a plurality of leg portions which stand on the bottom portion upright in juxtaposing manner and tip end sides of which are connected to the front chip core and form a magnetic closed circuit, wherein at least a cut out is formed at the portion of the closed member neighboring at least one outer most leg portion, in that cut out a terminal stand of a bobbin coil with terminals with which wiring is coupled is disposed, the bobbin is inserted in the leg portion and an approximately annular magnetic material made shield cover is provided in such a manner as it encloses the cut out.

The second feature of the present invention resides in that, in the constitution of the first feature, the operation gap consists of the read/write gap and the erasing gap, that the leg portions consist of three leg portions in juxtaposed manner and that the coil consists of a bobbin coil with the terminals for use of read/write to be coupled with one end side leg portion of the three leg portions and a bobbin with the terminals for use of erasing to be coupled with the other end side leg portion.

The third feature of the present invention resides in that, in the constitution of the first or second feature, the shield cover contacts to the back yoke with its one side and the other side contacts or come close to the front case.

The fourth feature of the present invention resides in that, in one feature of the first to third, the shield cover is made of a magnetic material having a high permeability.

The fifth feature of the present invention resides in that, in one of the features of the first to fourth, the bottom portion is provided with a stepped portion in order to form a gap between the terminal stand of the coil bobbin with the terminals and the shield cover.

The sixth feature of the present invention resides in that, in one of the features of the first to fifth, the front core, the back yoke and the shield cover are bonded in a unitary manner with adhesive.

DETAILED DESCRIPTION OF PREFERRED EMBODIMENTS

Hereinafter, the first embodiment of the magnetic head of the present invention is explained based on FIGS. 1 and 2. For reference, members and parts corresponding to the same member and part are assigned with the same signs and the explanation thereof are omitted.

Figure 10:
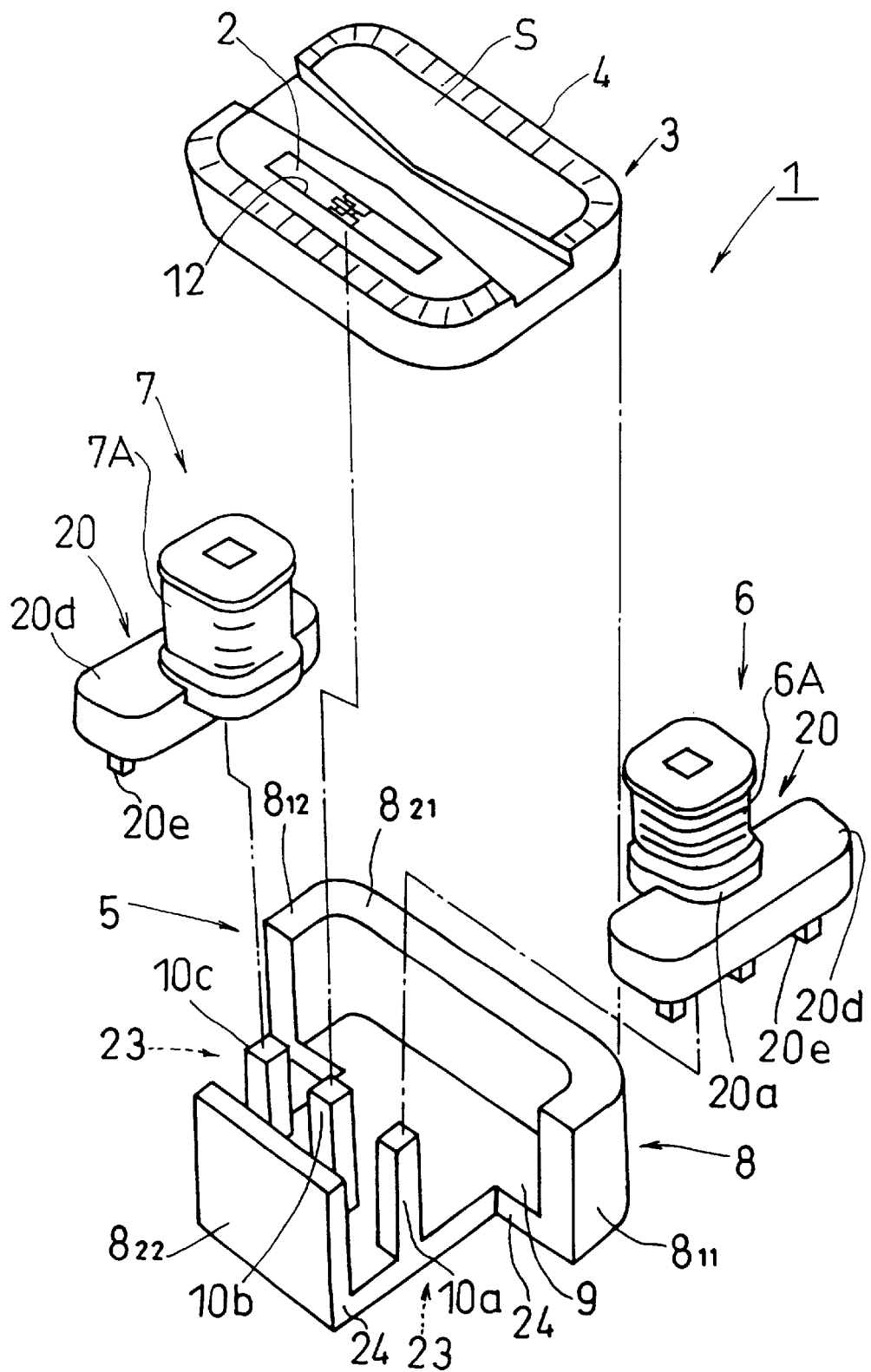
FIG. 10 is a broken perspective view showing still further example (the conventional example 6) of the present invention.
Figure 11:
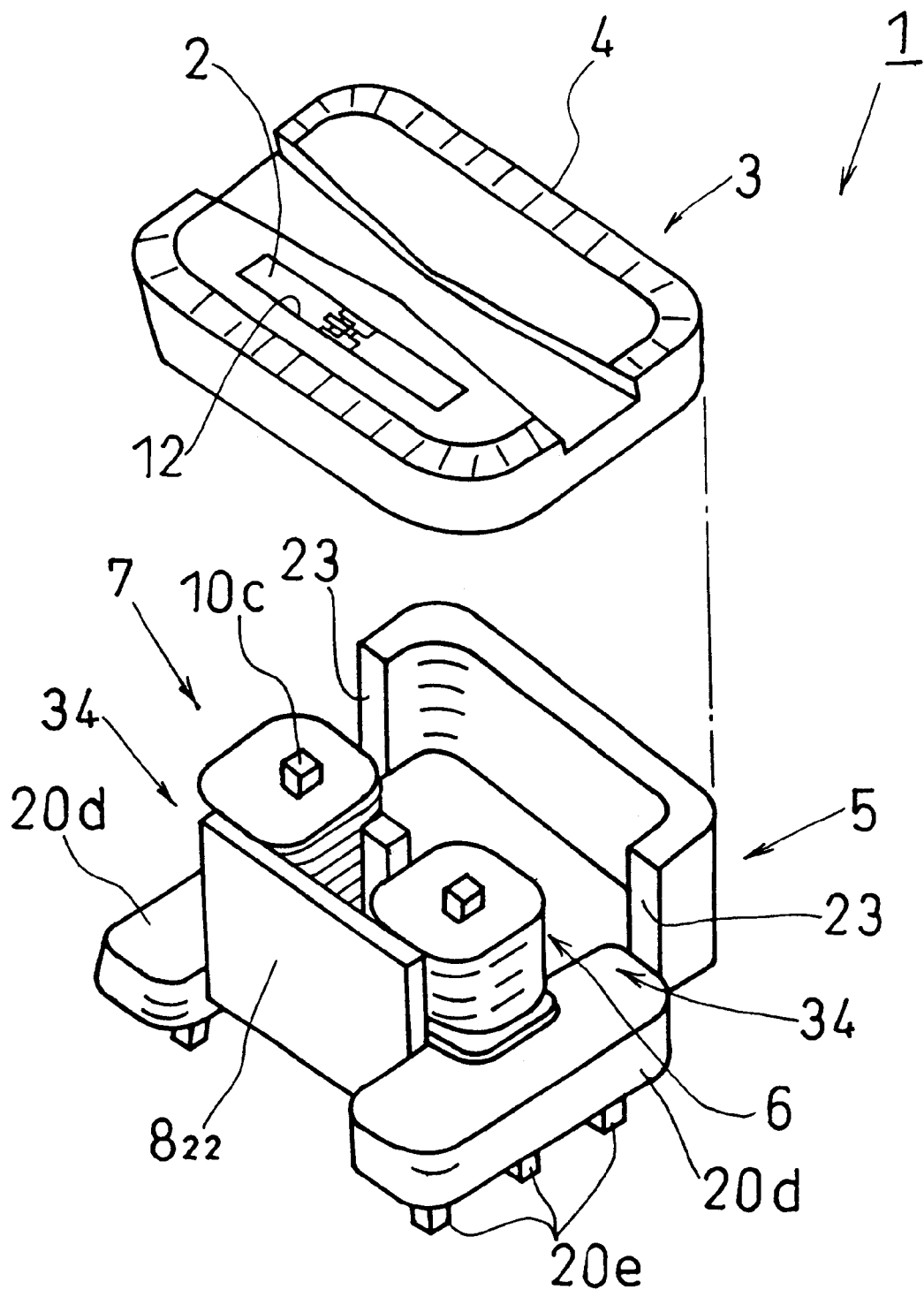
FIG. 11 is a broken perspective view showing the state where the read/write coil and the erasing coil are assembled on the back yoke of FIG. 10.

The magnetic head 1 in the first embodiment is different mainly in that points that, comparing to the magnetic head shown in FIGS. 10 and 11, a stepped portion 30 is formed on the bottom portion 9 of the back yoke 5, that a supplemental plate portion 31 is projected outside the proximal portion of the second long side portion $8_{22}$, and that the approximately a hollow square pillar-like shield cover 32 made of a magnetic material having a high permeability such as Mn—Zn ferrite and Ni—Zn ferrite is provided.

Now, in the cut out 23, the terminal stand 20d for read/write coil 6 and the terminal stand 20d for erasing coil 7 are disposed.

The step portion 30 is formed in such a manner as, of the bottom portion 9, height of an area at which the first, second and third leg portions 10a, 10b and 10c is to be formed is low and that of an area at which the first long side portion $8_{21}$ is high. The lower portion and the higher of the bottom portion 9 are called a lower floor 30a and a higher floor 30b respectively. The afore-mentioned supplemental plate portion 31 is adapted to become the same level as the higher floor 30b.

The shield cover 32 is formed hollow square pillar-like by connecting two opposing short sides (hereinafter referred to as "the first short side $32_{11}$", shown right lower in FIG. 1 and "the second short side $32_{12}$" shown left upper in FIG. 1) and two opposing long sides (hereinafter referred to as "the first long side $32_{21}$ of the cover side" shown upper right in FIG. 1 and as "the second long side $32_{22}$ of cover side" shown left lower in FIG. 1).

The length D of the width of the shield cover 32 (the length from the first long side $32_{21}$ of the cover side to the second long side $32_{22}$ of the cover side) is approximately same to the one (not shown) from side of the cut out 23 formed in the back yoke 5 to the supplemental plate 31, and a longitudinal length of the shield cover 32 (the length from the first short side $32_{11}$ of the cover side to the second short side $32_{12}$ of the cover side) F is approximately same to the longitudinal length of the back yoke 5 (length from the first short side $8_{11}$ to the second short side $8_{12}$) G, and when the read/write coil 6 and the erasing coil 7 are assembled on the back yoke 5, it can be adapted to surround within the shield cover 32 the bobbin body 20a including wiring 6A of the read/write coil 6 coupled with the first leg portion 10a, the bobbin body 20a including the wiring 7A of the erasing coil 7 coupled with the third leg portion 10c, the second leg portion 10b and the second long side $8_{22}$.

When assembled the read/write coil 6 and the erasing coil 7 on the back yoke 5, the height of the terminal stand 20d of the read/write coil 6 (the erasing coil 7) is adapted to be a little lower than the upper floor 30b, accordingly, as later mentioned, when the shield cover 32 is put on the upper floor 30b (supplemental plate portion), a little amount of gap 33 is adapted to be formed between the below surface of the cover 32 and the terminal stand 20d.

Since the shield cover 32 is adapted to locate the first long side $32_{21}$ of the cover side on the upper floor 30b, the second long side $32_{22}$ of the cover side on the supplemental plate 31, the first short side $32_{11}$ on the terminal stand 20d of the read/write coil 6 and the second short side $32_{12}$ on the terminal stand 20d of the erasing coil 7, and assembly them on the back yoke 5, when assembled, the first long side $32_{21}$ of the cover side contacts to the upper floor 30b, and the second long side $32_{22}$ of the cover side contacts to the supplemental plate 31, and then between the first short side $32_{11}$ of the cover side and the terminal stand 20d for the read/write coil 6 and between the second short side $32_{12}$ of the cover side and the terminal stand 20d for erasing coil 7 a little gap 33 is adapted to be formed (the state where the shield cover 32 is a little floated on the terminal stand 20d). And, through these gap 33, the lead 6a of the read/write coil 6 and the lead 7a of the erasing coil 7 are adapted to be inserted to avoid the leads from breaking.

Further, the height of the first, second and third leg portions 10a, 10b and 10c is set similar to the one of the outer body 8. The height of the shield cover 32 is as stated above in the state where the shield cover 32 is assembled on the back yoke 5 the upper surface of the shield cover 32 is, as compared to the upper surfaces of the first, second and third leg portions 10a, 10b and 10c (the outer body 8), set similar or a little lower. By such setting of the height of the shield cover 32, a complete closed magnetic circuit is secured due to a complete contacting between the front chip core 2 of the front core 3 and the first, second and third leg portions 10a, 10b and 10c of the back yoke 5 without any influence from the shield cover 32.

Further, the dimension of the shield cover 32 is set in such a manner as a remaining opening 34 (see FIG. 11) formed above the terminal stand 20d which is disposed in the cut out 23 is closed. That is, the shield cover 32 surrounds the wiring 6A of the read/write coil 6 and the wiring 7A of the erasing coil 7 and so on together with the closed member 40 and the terminal stand 20d and, in this embodiment, since it is not what has the above opening 34 (see FIG. 11) which the conventional art has, the magnetic shield is carried out completely.

Further, the back yoke 5, the shield cover 32 and the front core 3 are bonded with the adhesive such as UV resin or epoxy resin in a unitary manner at the portions opposed between the front core 3 and the shield cover 32, the front core 3 and the outer body 8, the shield cover 32 and the upper floor 30b of the back yoke 5, and the shield cover 32 and the supplemental plate 31.

In the magnetic head 1 of this first embodiment, since the shield cover 32 is provided in such a manner as it is coupled with the first, second and third leg portions 10a, 10b and 10c including the wiring 6A of the read/write coil 6 and the wiring 7A of the erasing coil 7, and that, the front core 3 is connected not only to the outer body 8 but also to the shield cover 32, so that the bridging portion of the front core 3 generated in the magnetic head 1 of the conventional example 6 is adapted to be approximately eliminated. Thereby, the strength of the front core 3 is increased and adapted to prevent the front core 3 from being broken due to any shocking force. In this case, since the front core 3 is bonded to the outer body 8 (back yoke 5) and to the shield cover 32 with any adhesive, it is tightly and securely connected to the back yoke 5 and the shield cover 32. Now, in this embodiment, since, as a bonding agent, UV resin or epoxy resin and such are used, the bonding of the front core 3 to the back yoke 5 and to the shield cover 32 is reinforced.

Further, since the shield cover 32 includes the wiring 6A of the read/write coil 6 and the wiring 7A of the erasing coil 7 and is positioned in such a manner as the forming wall portions and such of the cut out 23 are disposed outside, a positioning precision can be increased.

Since the back yoke 5, the shield cover 32 and the front core 3 are bonded in a unitary manner at the portions opposed between the front core 3 and the shield cover 32, the front core 3 and the outer body 8, the shield cover 32 and the upper floor 30b of the back yoke 5, and the shield cover 32 and the supplemental plate 31, comparing to the conventional art, the bonding area becomes larger and the front core 3 and the back yoke 5 is bonded more securely and prevented from being peeled off to increase the anti-shock force of the magnetic head 1. In this case, since the bonding between the back yoke 5, the shield cover 32 and the front core 3 is carried out by using an adhesive, these can be bonded tightly. Now, in this embodiment, as the bonding agent, since a UV resin, an epoxy resin or the like is used, the bonding of the back yoke 5, the shield cover 32 and the front core 3 can be more reinforced.

Further, in the cut out 23 the terminal stand 20d of the read/write coil 6 and the terminal stand 20d of the erasing coil 7 are disposed and avoided the terminal stand 20d from being disposed outside the back yoke 5, thereby to that extent, the miniaturization of the apparatus can be planned.

Further, since the magnetic head 1 has the read/write gap $G_1$ (operation gap) and the erasing gap $G_2$ (operation gap), comparing with the case where the read/write gap $G_1$ and the erasing gap $G_2$ are provided on a separated magnetic head respectively, a more precise read/write and erasing functions of the information can be expected.

Figure 1:
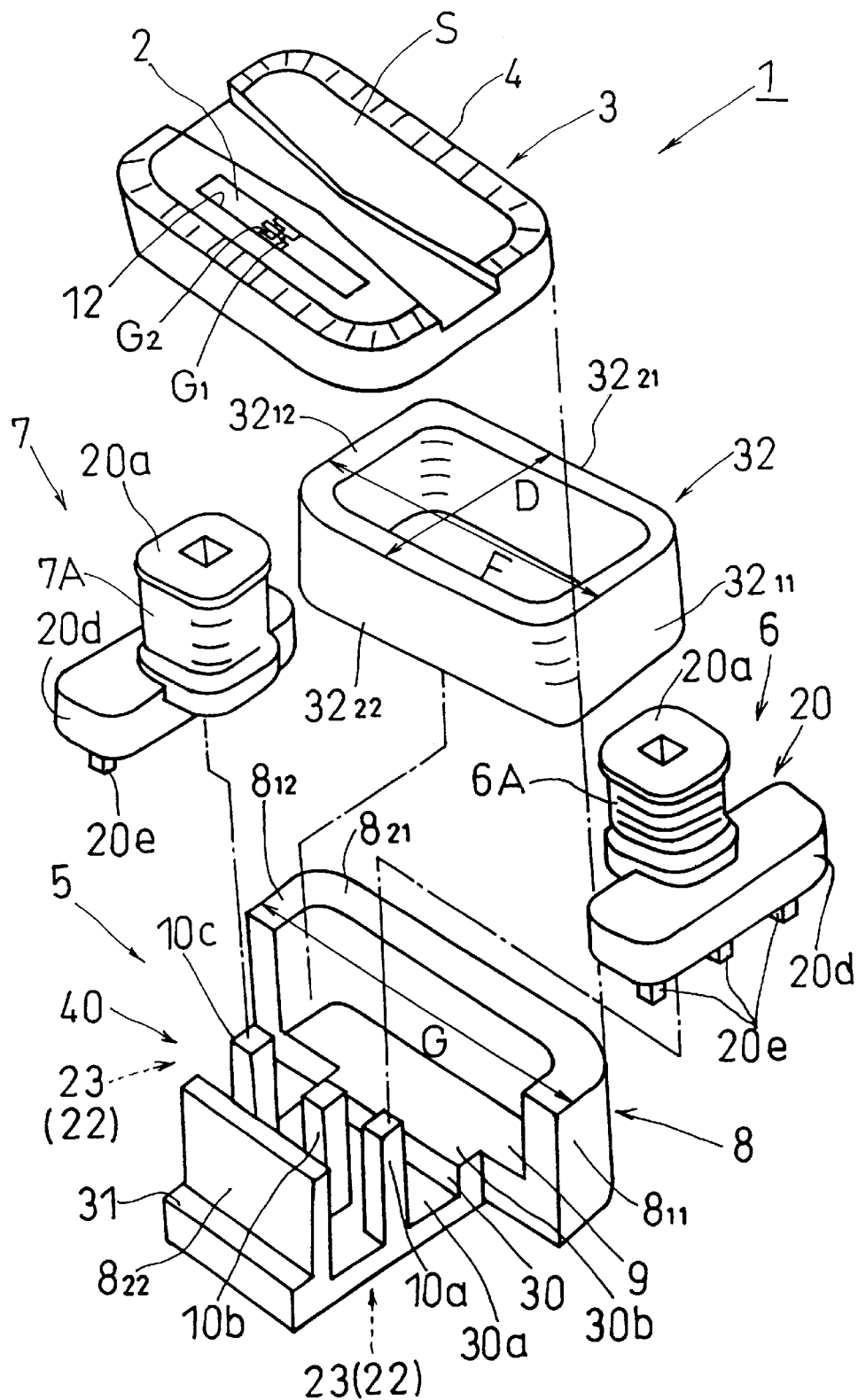
FIG. 1 is a broken perspective view of the magnetic head of the first embodiment of the present invention.
Figure 2:
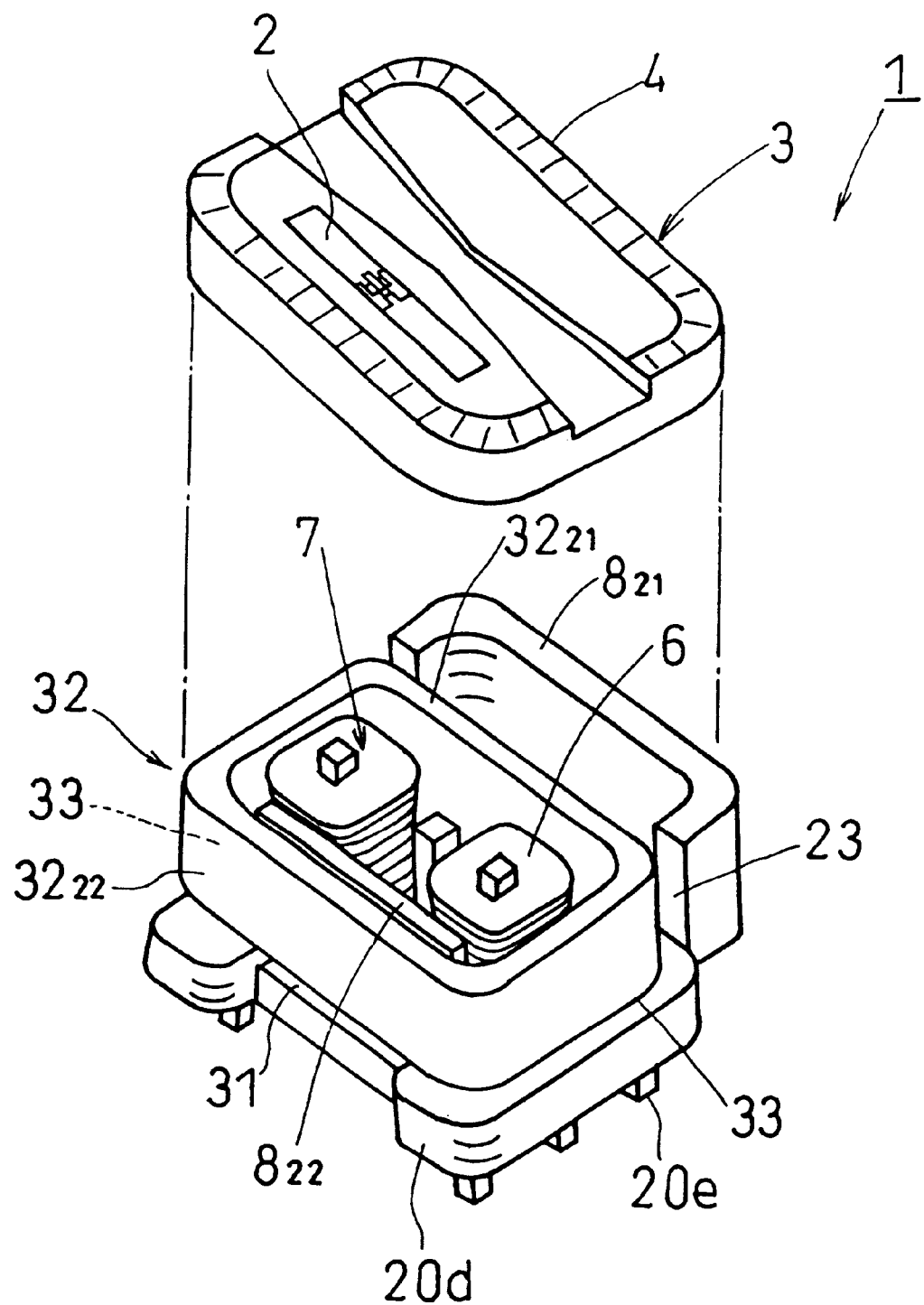
FIG. 2 is a broken perspective view showing the state where the shield cover, the read/write coil and the erasing coil are assembled on the back yoke of FIG. 1.

Now, in the present invention, the provision of the read/write gap $G_1$ and the erasing gap $G_2$ in a single magnetic head is not limited to that type, for instance, in FIG. 1, without the erasing gap $G_2$, the erasing coil 7 and the third leg portion 10c, the magnetic head 1 may be formed. In this case too, almost without generating the bridge portion of the front core 3 in the conventional example 6, the reinforcing of the apparatus can be planned. For reference, in the case where the erasing gap $G_2$, the erasing coil 7 and the third leg portion 10c are omitted, the portions of the front core 3 and of the back yoke 5 corresponding to these omitted members can be eliminated, which caused to that extent the shape of the apparatus can be miniaturized.

The shield cover 32 is made of a magnetic material and can function as a magnetic shield in association with the closed member 40 and the terminal stand 20d. In this case, as shown in FIG. 11, since the opening 34 of the cut out 23 which remains above the terminal stand 20d is closed with the shield cover 32, the magnetic shield can be completely carried out. Further, in this embodiment, the shield cover 32 is made from a magnetic material having a high permeability, and thereby the shielding property is increased.

Figure 3:
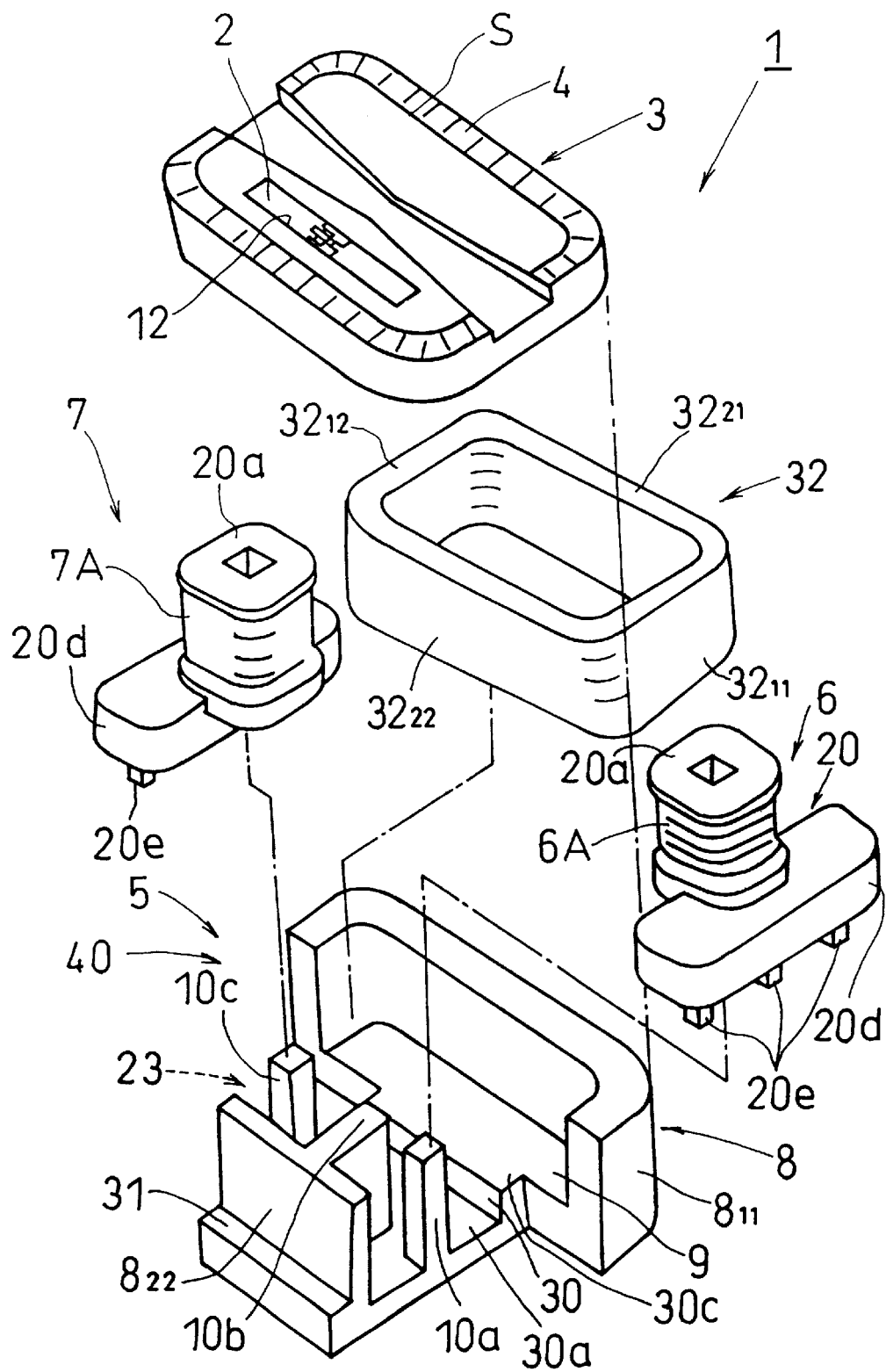
FIG. 3 is a broken perspective view of the magnetic head of the second embodiment of the present invention.
Figure 4:
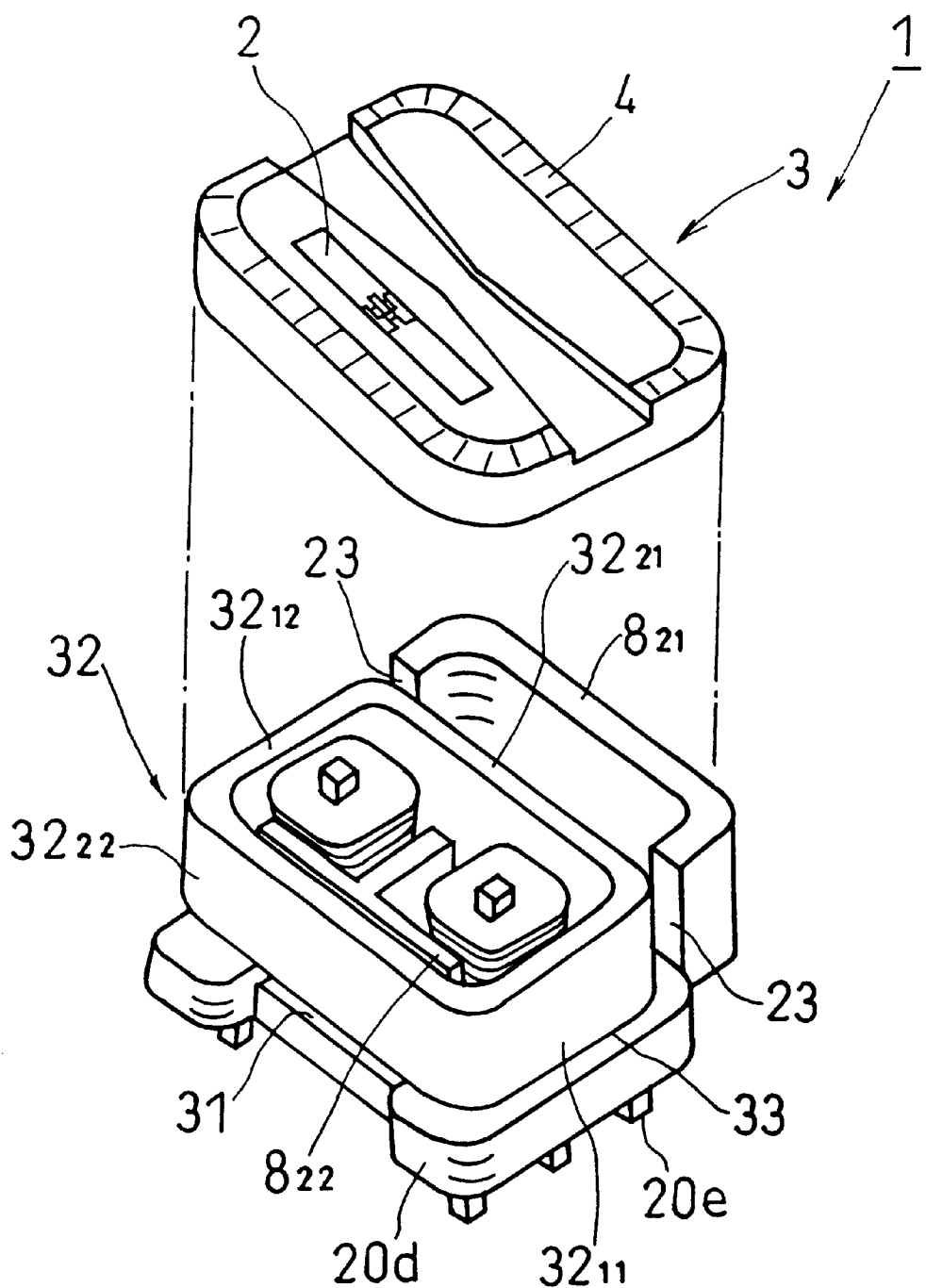
FIG. 4 is a broken perspective view showing the state where the shield cover, the read/write coil and the erasing coil are assembled on the back yoke of FIG. 3.
Figure 5:
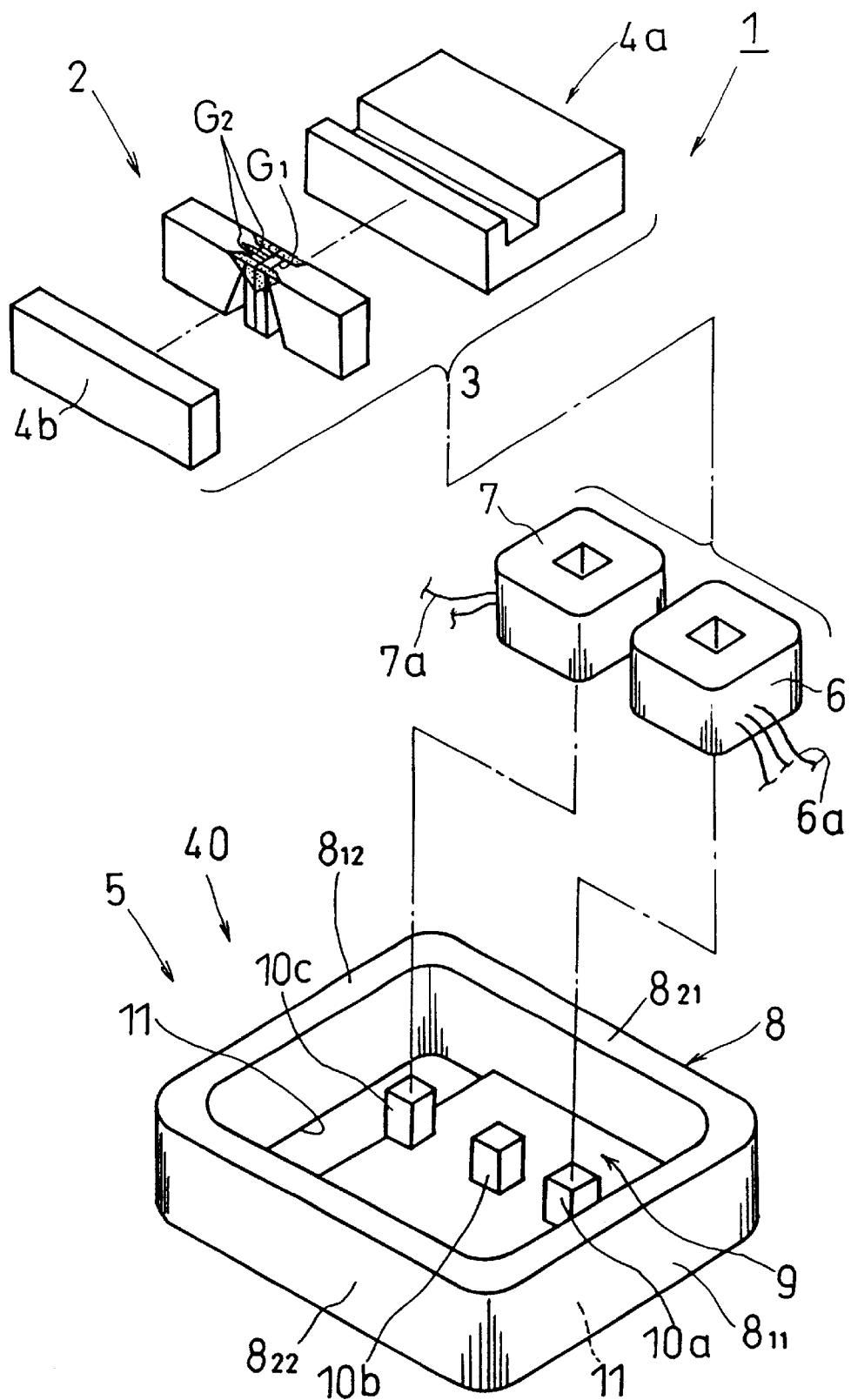
FIG. 5 is a broken perspective view showing one example (the conventional example 2) of the present invention.
Figure 6:
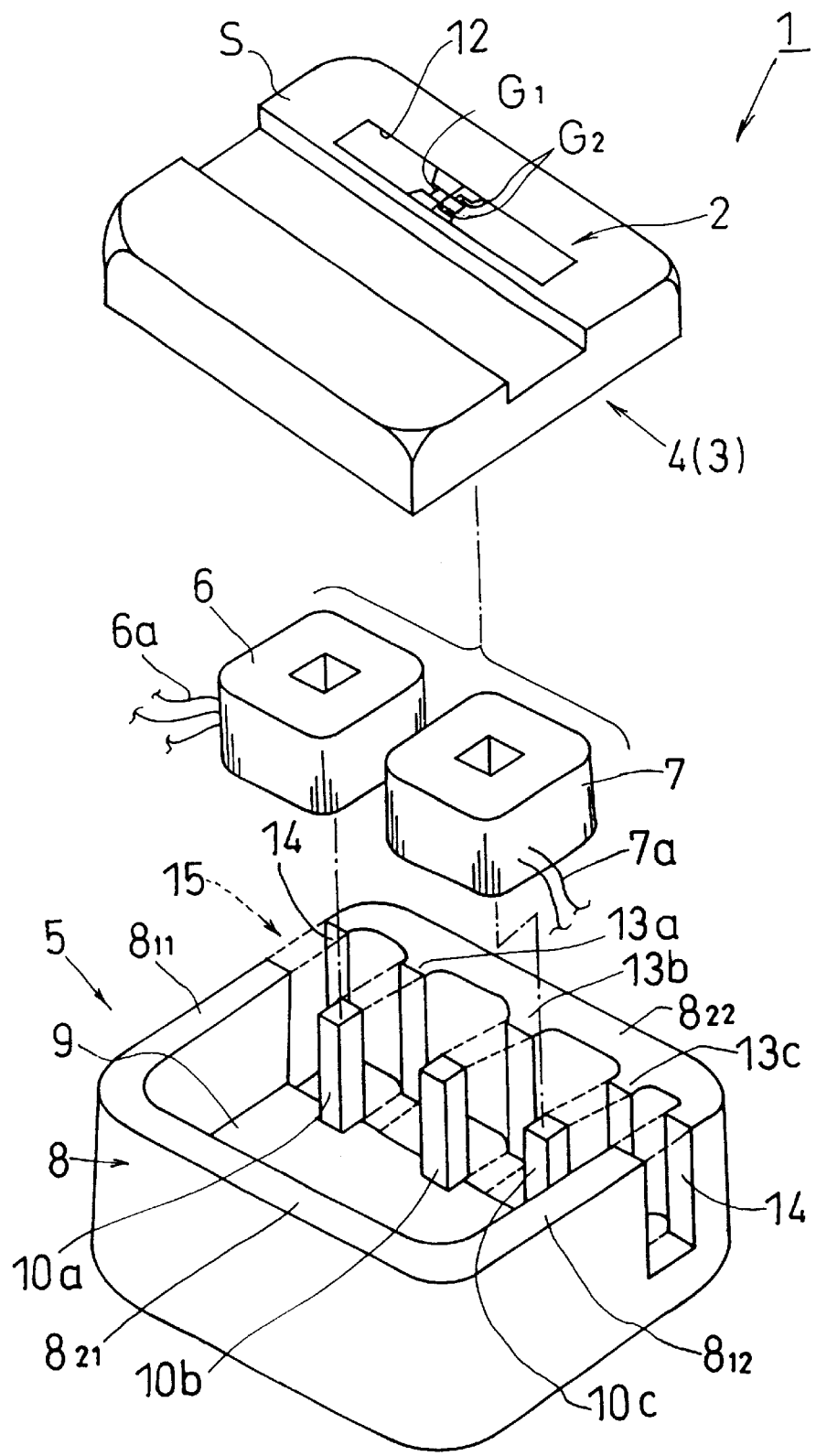
FIG. 6 is a broken perspective view showing the other example (the conventional example 3) of the conventional magnetic head.
Figure 7:
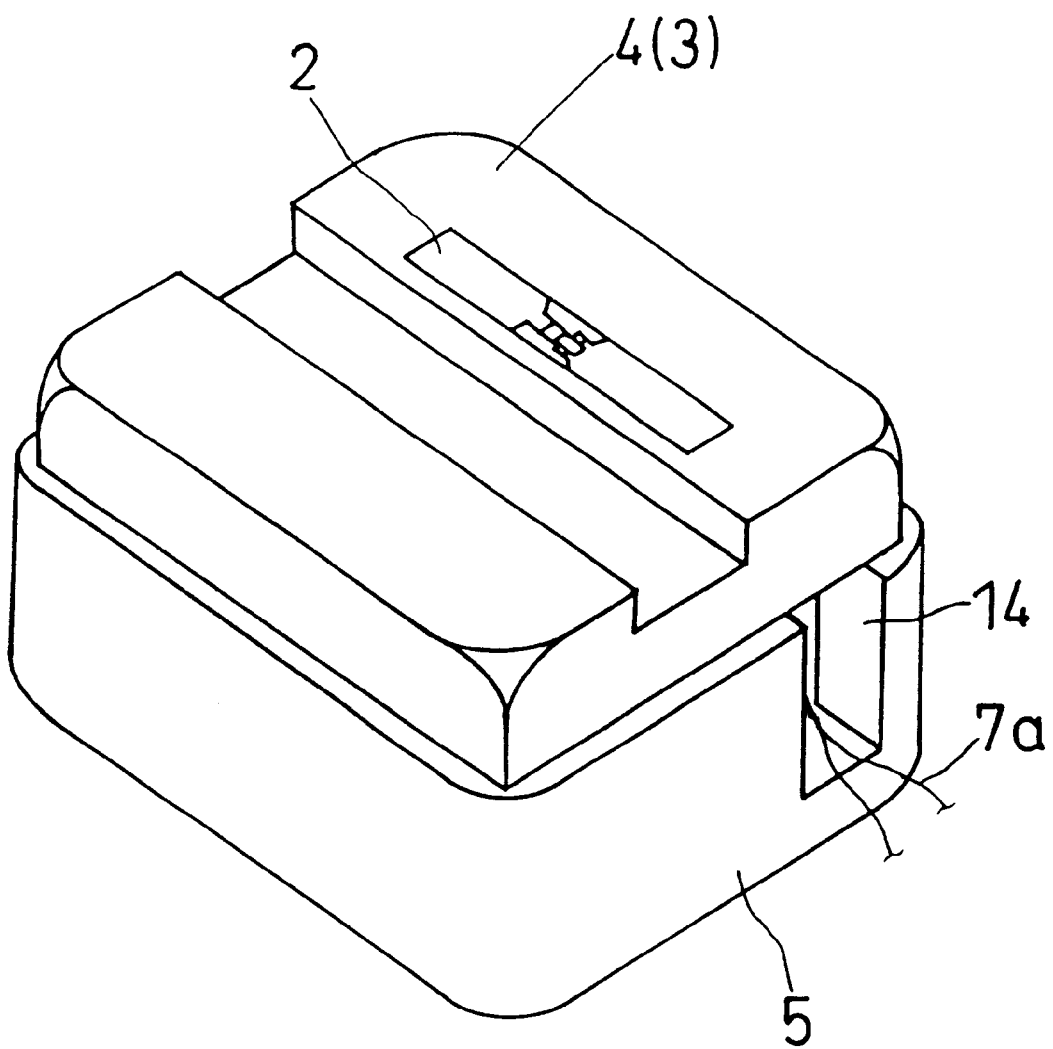
FIG. 7 is a perspective view of the front core of FIG. 6.
Figure 8:
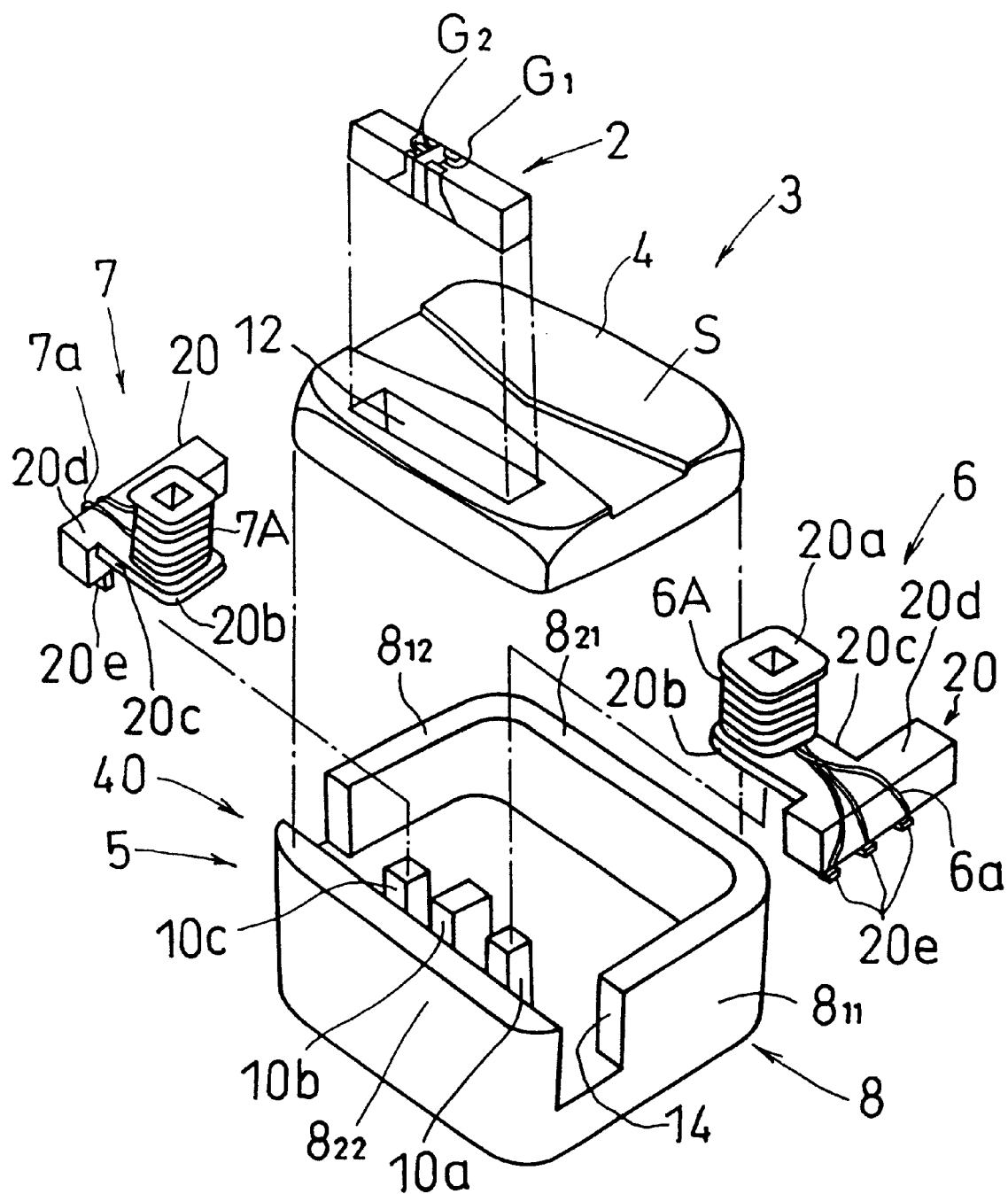
FIG. 8 is a broken perspective view showing still further example (the conventional example 4) of the present invention.
Figure 9:
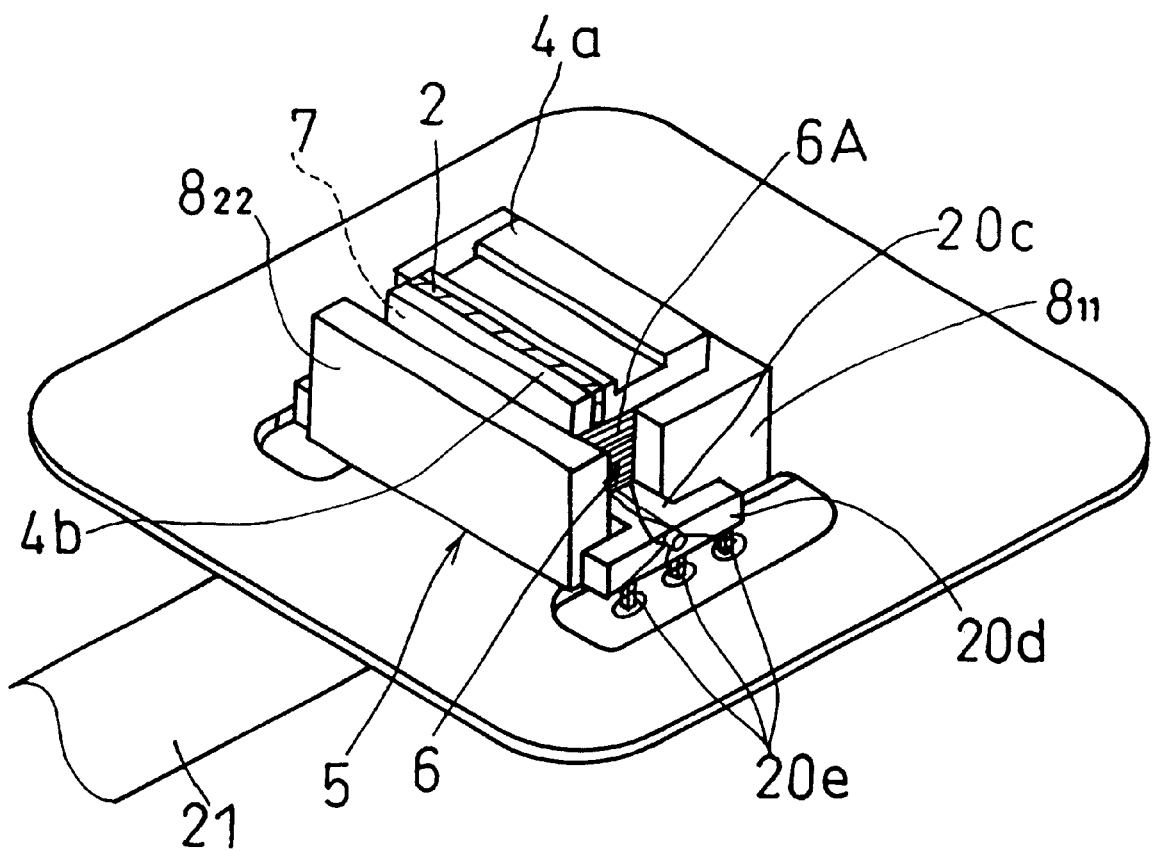
FIG. 9 is a broken perspective view showing still further example (the conventional example 5) of the present invention.

Next, the second embodiment of the present invention is explained based on FIGS. 3 and 4.

In this magnetic head 1 of the second embodiment, comparing to the first embodiment, it is different that the second leg portion 10b is connected to the second long side $8_{22}$ (the outer body 8). As to the other portions, those are similar to the ones of the first embodiment, so that the explanations of these are occasionally omitted.

In thus formed magnetic head 1, the second leg portion 10b and the second long side $8_{22}$ (the outer body 8) are connected each other, and thereby the sectional area of the second leg portion 10b can be increased comparing to the first embodiment (the connecting portion between the second leg portion 10b and the second long side $8_{22}$ is to be made use of as one part of the second leg portion 10b), so that the magnetic resistance is decreased to increase the efficiency of the read/write.

Further, to the first and third leg portions 10a and 10c the read/write coil 6 and the erasing coil 7 (bobbin 20) are adhered, thereby the reinforcing of the first and third leg portions is planned. Further, since the second leg portion 10b is adapted to be connected to the outer body 8, it can have a great strength. Thereby, even if any shock is applied to the first, second and third leg portions 10a, 10b and 10c during assembling and using, the generation of any bending or crack can be prevented.

The followings are the effects to be derived from each feature of the present invention.

According to the first feature, since the shield cover for surrounding a plurality of leg portions and coil wirings is provided and the front core can be connected not only to the outer body but also to this shield cover, the conventional bridging portion of the front core can be almost eliminated, to that extent the strength of the front core can be increased, which cause to prevent the front core from being broken due to any shock.

Further, since the terminal stand is disposed in the cut out and is not disposed outside the back yoke, to that extent, the miniaturization of the apparatus can be planned.

And, an approximately annular and magnetic material made shield cover is provided in order to surround a plurality of leg portions and the coil wirings and close the cut out together with the terminal stand, thereby the opening which has to remain even by disposing the terminal stand in the cut out in the conventional art is adapted to be closed with the shield cover to carry out a good magnetically shielding.

According to another feature, the magnetic head is provided with the read/write gap and the erasing gap as operation gap, and thereby the precise read/write and erasing operation can be carried out.

According to still another feature, since one side of the shield cover abuts to the back yoke and the other side abuts to or come close to the front core, at the portion of connecting or coming close, the connection of both can be realized to increase the bonding area, to that extent, the bonding strength of the front core is planned to be increased.

According to still another feature, the shield cover is made from the magnetic material having a high permeability such as Mn—Zn ferrite or Ni—Zn ferrite, thereby the magnetic shielding property is more increased.

According to still another feature, the bottom portion is provided with a stepped portion, which causes to form a gap between the terminal stand of the bobbin coil with the terminals and the shield cover, through such a gap the lead of the wiring can be come through to prevent the lead from broken.

According to still another feature, the unification of the front core, the back yoke and the shield cover is carried out by using an adhesive, so that the bonding can be securely carried out.

What is claimed is:

1. A magnetic head comprises:
    a front chip core having operation gaps,
    a slider made of a non-magnetic material, which is unified with the front chip core and forms a front core, one side of which slides on a magnetic recording medium,
    a back yoke made of a magnetic material which is bonded to the other side of the front core, wherein the back yoke comprises a closed member consisting of a hollow square pillar-like outer body to be connected to the front core with a tip end thereof and a bottom portion formed at a proximal side of the outer body, a plurality of leg portions which stand upright in juxtaposing manner on the bottom portion, tip end of which is bonded to the front chip core, and form a closed magnetic circuit together with the front chip core and the bottom portion, and a cut out is formed at a portion of the closed member which is located nearby at least one end side leg portion of a plurality of leg portions, in which a terminal stand of a bobbin coil with terminals formed by being coupled with a wiring is disposed and the bobbin is coupled in a leg portion,
    wherein further an approximately hollow square pillar-like shield cover made of a magnetic material, which surrounds a plurality of leg portions and the wiring of the coil to close the cut out with the terminal stand of the coil, is provided,
    wherein a stepped portion is provided on the bottom portion in such a manner as a gap is formed between the terminal stand of the bobbin coil with the terminals and the shield cover such that a lead of the wiring can come through the gap.

2. A magnetic head according to claim 1, wherein the operation gaps consist of a read/write gap and an erasing gap, leg portions consist of three in juxtaposing, and the coil consists of a bobbin coil with terminals for read/write to be coupled with one end side leg portion and a coil bobbin with terminals for erasing to be coupled with the other end side leg portion of three leg portions.

3. A magnetic head according to claim 2, wherein the shield cover is made of a magnetic material having a high permeability.

4. A magnetic head according to claim 2, wherein a stepped portion is provided in the bottom portion in such a manner as a gap is formed between the terminal stand of the bobbin coil with the terminals and the shield cover.

5. A magnetic head according to claim 2, wherein the front core, the back yoke and the shield cover are bonded in a unit with adhesive.

6. A magnetic head according to claim 1, wherein one side of the shield cover abuts to the back yoke and the other side thereof abuts to or comes close to the front core.

7. A magnetic head according to claim 6, wherein the shield cover is made of a magnetic material having a high permeability.

8. A magnetic head according to claim 6, wherein a stepped portion is provided in the bottom portion in such a manner as a gap is formed between the terminal stand of the bobbin coil with the terminals and the shield cover.

9. A magnetic head according to claim 6, wherein the front core, the back yoke and the shield cover are bonded in a unit with adhesive.

10. A magnetic head according to claim 1, wherein the shield cover is made of a magnetic material having a high permeability.

11. A magnetic head according to claim 10, wherein a stepped portion is provided in the bottom portion in such a manner as a gap is formed between the terminal stand of the bobbin coil with the terminals and the shield cover.

12. A magnetic head according to claim 10, wherein the front core, the back yoke and the shield cover are bonded in a unit with adhesive.

13. A magnetic head according to claim 1, wherein the front core, the back yoke and the shield cover are bonded in a unit with adhesive.

14. A magnetic head according to claim 1, wherein the front core, the back yoke and the shield cover are bonded in a unit with adhesive.

* * * * *